United States Patent [19]

Sekiya

[11] 4,256,258
[45] Mar. 17, 1981

[54] TEMPERATURE MONITOR AND ALARM SYSTEM

[75] Inventor: George W. Sekiya, Chicago, Ill.

[73] Assignee: Mark Controls Corporation, Evanston, Ill.

[21] Appl. No.: 95,231

[22] Filed: Nov. 19, 1979

[51] Int. Cl.³ .................................................. G05D 23/19
[52] U.S. Cl. ............................... 236/94; 122/504.2; 340/593; 340/507; 165/11 R
[58] Field of Search .............................. 236/94; 165/11; 340/593, 584, 540, 507; 4/145, 179; 122/504.2; 62/129, 130

[56] References Cited

U.S. PATENT DOCUMENTS

| 3,011,161 | 11/1961 | Freundt | 340/593 X |
| 3,028,586 | 4/1962 | Reda | 340/507 |
| 3,521,276 | 7/1970 | Raber | 340/584 X |
| 3,707,851 | 1/1973 | McAshan, Jr. | 62/129 X |
| 3,871,443 | 3/1975 | Jones | 165/11 |
| 3,911,412 | 10/1975 | Bennetts | 340/593 X |
| 4,169,357 | 10/1979 | Kelley | 236/94 X |

Primary Examiner—William E. Tapolcai, Jr.
Attorney, Agent, or Firm—Hume, Clement, Brinks, Willian & Olds, Ltd.

[57] ABSTRACT

The disclosed temperature monitoring and alarm circuit includes a temperature responsive switch which opens when water temperature exceeds a predetermined point. When the switch opens, a relay is de-energized, thereby activating a latch which activates a visual alarm and closes off a solenoid operated valve on the monitored water source until the over temperature condition is corrected and the circuit is reset.

8 Claims, 2 Drawing Figures

TEMPERATURE MONITOR AND ALARM SYSTEM

BACKGROUND OF THE INVENTION

The present invention relates generally to alarm circuits and more particularly to an alarm circuit adapted to monitor water temperature and to trigger an alarm if the monitored temperature departs from an established range.

Modern hot water systems, such as those used to supply bath and shower water in hospitals, hotels, and other institutions, are often capable of delivering dangerously hot water. Under most situations, the individual using the water can be relied on to temper water temperature to a safe and comfortable level, to remove himself from the water or to shut off water flow. However, under some conditions, the individual user may not be capable of adequately protecting himself. For example, aged, sick, infirm, or very young individuals may be unable either to get out of a bath or shower or to turn off flowing bath water if it should suddenly become dangerously hot.

SUMMARY OF THE INVENTION

The present invention is directed to a reliable alarm circuit for monitoring a condition such as water temperature and providing an alarm if the monitored condition departs from a predetermined range. The preferred embodiment of the invention includes an audio alarm, a visual alarm, as well as means for shutting off water flow as long as either alarm is activated.

According to this invention, a temperature monitoring and alarm circuit is provided with a temperature sensor which provides a signal when water temperature is within a selected temperature range. An alarm such as an audio or visual alarm, or both, is controlled by switching means and latching means. The switching means is responsive to the sensor and acts to disable the alarm in response to the sensor signal. The latching means acts to maintain the alarm in the activated state after a momentary interruption of the sensor signal.

Preferred embodiments of this invention provide a visual alarm which cannot be reset until the out of range temperature condition is corrected, an audio alarm which can be reset at any time, and a solenoid valve for shutting off water flow whenever the visual alarm is activated.

The alarm circuit of this invention is simple, relatively inexpensive to manufacture, and reliable. It can be designed with a failsafe capability, so that the temperature sensor forms a positive part of the circuit and any attempt to remove the sensor activates the alarm. This invention provides positive protection against excessively hot water: the alarm alerts persons in the area of the danger, and the solenoid valve included in some embodiments eliminates the danger by closing off the water flow.

The invention, together with further objects and attendant advantages, will be best understood by reference to the following detailed description taken in connection with the accompanying drawings.

DETAILED DESCRIPTION OF A PREFERRED EMBODIMENT

Figure 1:
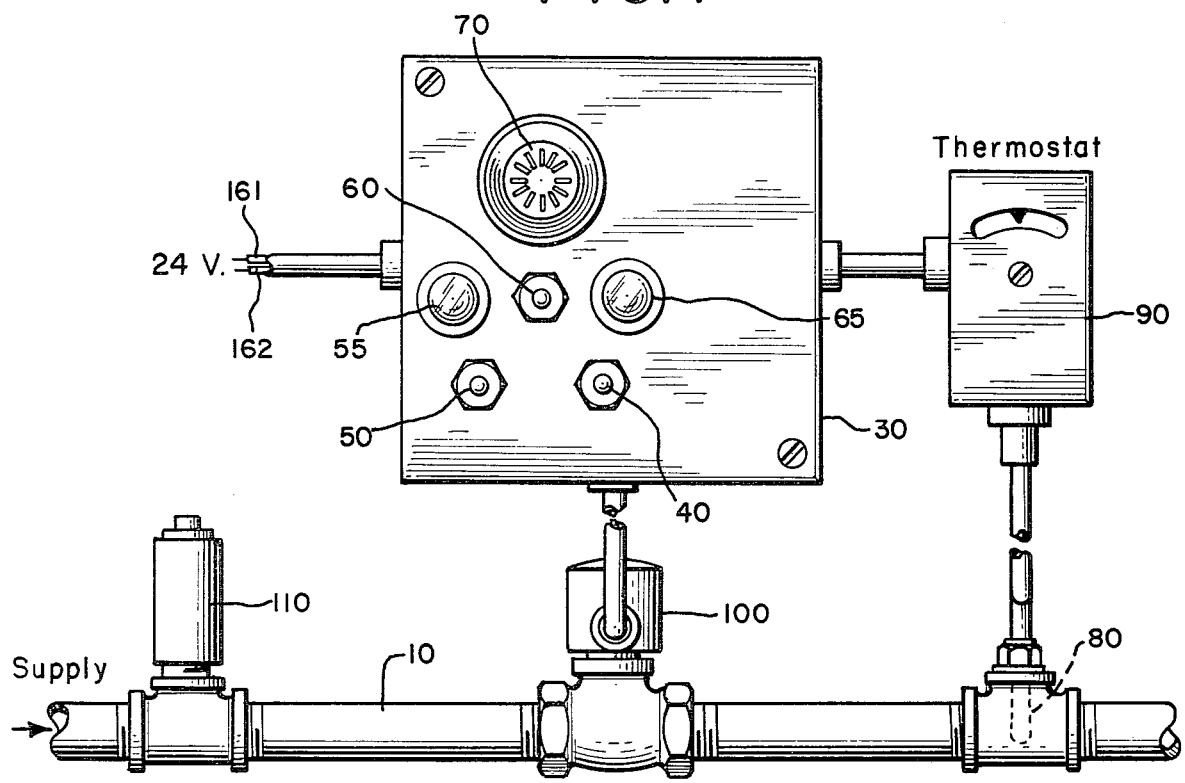
FIG. 1 shows an overall view of a preferred embodiment of the alarm circuit of this invention connected to a water pipe.
Figure 2:
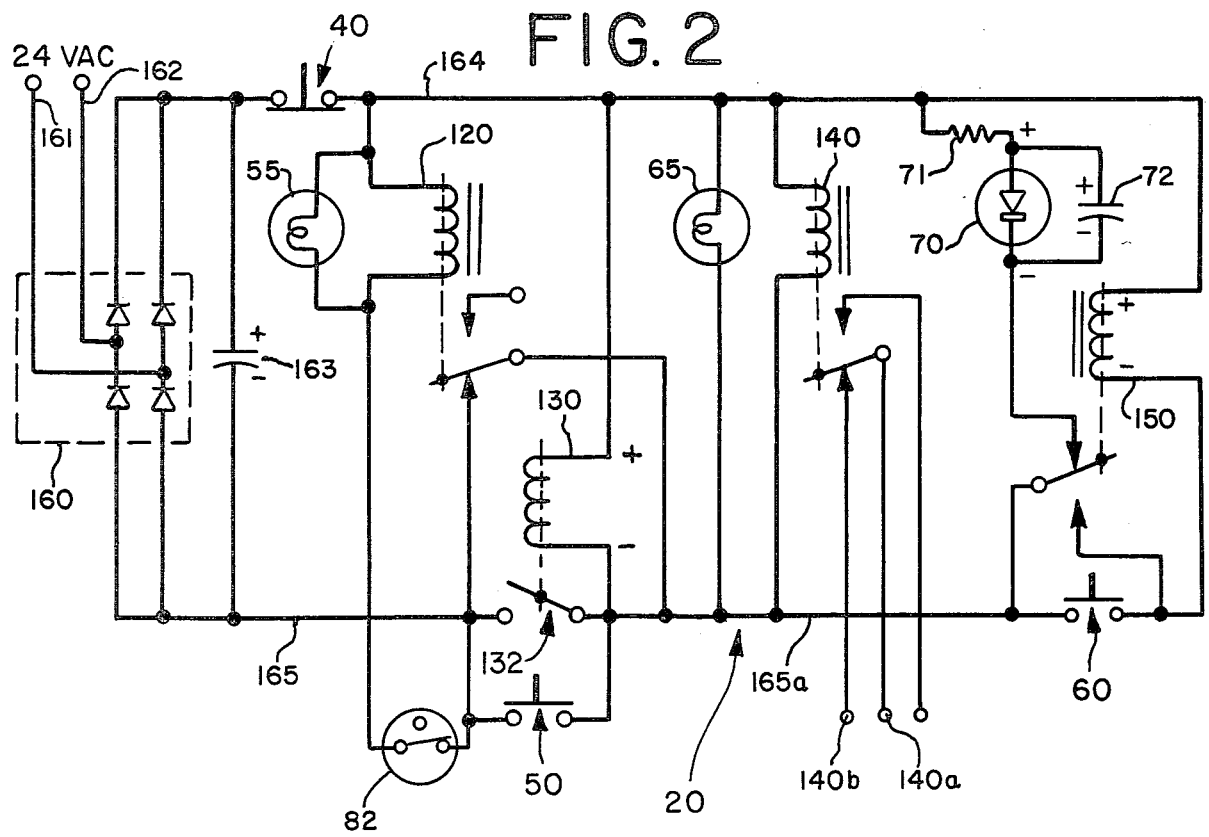
FIG. 2 shows a schematic diagram of the alarm circuit of FIG. 1.

Referring now to the drawings, FIG. 1 shows a water pipe 10 to which is connected a preferred embodiment of the alarm circuit 20 of this invention. The circuit 20, which is shown in detail in FIG. 2, is housed in a circuit enclosure 30. This enclosure is provided with a reset switch 40, a test switch 50, an audio alarm 70, and an audio alarm silence switch 60. In addition, a visual alarm indicator 65 and a normal condition indicator 55 are provided. The functions of these elements will be explained below in connection with FIG. 2.

The circuit 20 in the enclosure 30 is electrically connected to a temperature sensor 80. This sensor 80 measures the water temperature in the pipe 10, and includes a switch 82 which is closed at water temperatures below a pre-selected temperature and open at temperatures above this pre-selected temperature. The water temperature at which the switch 82 changes state is selectable by means of the thermostat 90.

Such sensors and thermostats are well known to those skilled in the art and will not, therefore, be described in detail here. In this preferred embodiment the sensor 80 and thermostat 90 are sold by Powers Regulator Company, Skokie, Ill., and are identified as Remote Bulb Thermostat Part Number 141-0521. This unit is described in Powers Regulator Technical Instruction ET141-2 (June, 1976) which is hereby incorporated by reference in this specification.

The circuit 20 is connected to a solenoid valve 100 positioned in the water pipe 10 upstream of the sensor 80. This valve 100, which is preferably a normally closed valve in which current must be applied to the valve to permit water flow, is operated by current which is switched by the circuit 20. This ensures that in the event of a power failure the water flow is terminated, thereby providing over-temperature protection even when the circuit 20 is not powered.

Suitable valves 100 are well known to those skilled in the art and will not, therefore, be described in detail here. In this preferred embodiment, solenoid valves sold by Jackes-Evans Mfg. Co., Jackson, Miss. and identified as Series "J" Industrial Solenoid Valves Model Numbers J6, J10, J12, J14, and J20 are used, depending on the diameter of the water pipe 10. These valves are described in detail in product data sheets distributed by Jackes-Evans Mfg. Co., which are hereby incorporated by reference in this specification.

Also included in the embodiment of FIG. 1 is a standard water hammer arrester 110, preferably the arrester sold by the Wade Division of the Tyler Pipe Co. and identified as the "Shokstop" Catalog Number W-10.

Turning now to FIG. 2, the circuit 20 of this preferred embodiment is a four relay circuit. In this representation, the reset switch 40, the test switch 50, and the audio alarm silence switch 60 are shown in their normal positions. Each of these switches 30, 40, 50 is preferably a momentary push button switch which can be switched from the condition shown in FIG. 2 to the opposite condition by the application of finger pressure. As shown, the reset switch 40 is normally closed and both the test switch 50 and the audio alarm silence switch 60 are normally open.

The four relays 120, 130, 140, 150 in FIG. 2 are each shown in their de-energized states. In each case, when current is passed through the relay coil, the respective switch is moved from the position shown in FIG. 2 to the alternate position.

The circuit 20 includes a full wave bridge rectifier 160 that rectifies the 24 volt a.c. voltage on power conductors 161, 162 and, in conjunction with the capacitor 163, establishes a positive working voltage on line 164 and a lower return voltage on line 165. In this embodiment the capacitor 163 has a capacitance of 15 microfarads. It is the voltage difference between line 164 and line 165 that provides the power to operate each of the alarms 65, 70 as well as the solenoid valve switching relay 140.

Relay 120 operates as a latch to deactivate the alarms 65, 70 when the measured water temperature is below the pre-selected switching temperature and the sensor switch 82 is therefore closed. Under these conditions, current flows from line 164, through the coil of relay 120 and the sensor switch 82, to the return line 165. This current energizes relay 120, causing its switch to move to the alternate position to create an open circuit between line 165 and its extension, line 165a. Whenever the relay 120 is energized, the normal condition indicator 55 is activated. In this embodiment, the indicator 55 is a green filtered lamp. When water temperature rises above the pre-selected switching temperature, the sensor switch 82 opens. This de-energizes the relay 120, thereby connecting lines 165 and 165a. Relay 120 is rated at 24 VDC and has an operate or switching time of approximately 5 milliseconds.

The relay 130 operates as a latch to maintain a connection between lines 165 and 165a once an initial connection is made via the relay 120. The coil of relay 130 is connected between line 164 and line 165a, and at normal water temperature it is therefore de-energized. However, once the sensor switch 82 opens, deactivating relay 120 and connecting lines 165 and 165a, the coil of relay 130 is energized, thereby closing switch 132. Once switch 132 has been closed, relay 130 is effectively latched into an energized state. In this way a connection between line 165a and line 165 is established which is independent of the instantaneous state of the sensor switch 82.

Once line 165a is connected to line 165, line 165a becomes a voltage return line. This energizes the visual alarm indicator 65, the solenoid valve switching relay 140, and the audio alarm 70. The visual alarm indicator 65 is preferably a red filtered lamp.

The relay 140 is used to control the solenoid valve 100. Under normal conditions, when the relay 140 is de-energized, the valve 100 is energized by current which passes from an external source (not shown) from conductor 140a, through the switch of relay 140 and conductor 140b, to the valve 100. As described above, the valve 100 permits water to flow through the pipe 10 when the valve 100 is energized. Under alarm conditions the relay 140 is energized. This breaks the connection between conductors 140a and 140b to de-energize the valve 100 and stop water flow in the pipe 10.

The audio alarm 70 is also activated when line 165a is connected to line 165. This alarm generates a piercing sound which can be silenced at any time by momentarily depressing switch 60 to energize the relay 150. Once the relay 150 is momentarily energized it latches into an energized mode in which the audio alarm 70 is silenced. Preferably the audio alarm 70 is rated to operate at a sound pressure of 95 dbA at 25 VDC. Resistor 71 is a 2K ohm resistor connected in series with the audio alarm 70 to protect it from overvoltage. Capacitor 72 is connected in parallel with the audio alarm 70 and has a capacitance of 15 microfarads.

Relays 130 and 150 are rated at 24 VDC, low power consumption, and preferably have an operate time of about 15 milliseconds. Relay 140 is rated at 24 VDC, low power consumption. The operate time of relay 140 is not critical, and its lead contacts are rated at 8 amperes at 220 VAC.

The operation of the circuit of FIG. 2 will now be described, assuming that the sensor switch 82 is initially closed, indicating a normal temperature condition. To initialize the circuit, the re-set switch 40 is depressed for a period greater than 15 milliseconds. This de-energizes all four of the relays 120, 130, 140, 150, and both of the alarms 65, 70. When the re-set switch 40 is closed, relay 120 switches state before relay 130, due to its faster operate time. This latches the circuit in the normal operation mode, with the normal condition indicator 55 on, and the relays 130, 140, 150 and the alarms 65, 70 de-energized.

Once the sensor switch 82 opens for more than 20 milliseconds, relay 120 switches to its de-energized state and relay 130 switches to its energized state. This closes switch 132, thereby activating alarm indicator 65 and audio alarm 70, as well as energizing relay 140 to remove current from the valve 100.

Once the alarms 65, 70 have been activated, the audio alarm 70 can be silenced by momentarily depressing switch 60. However, the visual alarm 65 cannot be turned off and the valve 100 cannot be re-energized to restore water flow until the switch 82 returns to its closed state and the re-set switch 40 is depressed. Because of the failsafe design of this circuit, water flow in the pipe 10 will be terminated by the valve 100 whenever the sensor switch 82 is disconnected from the circuit 20 or power is removed from the valve 100. The entire system must be properly assembled and powered before water flow is permitted.

The test switch 50 is placed in parallel with the switch 132 to permit the alarms 65, 70 and the relays 130, 140, 150 to be tested. Once the switch 50 is closed both of the alarms 65, 70 as well as the relays 130, 140 are activated. Switch 60 can then be operated to test relay 150. After testing has been completed, the re-set switch 40 can be momentarily closed to de-energize all of the relays, indicators, and alarms. After the re-set switch 40 is allowed to open the relay 120 switches first if the switch 82 is closed, thereby latching the circuit in the normal operating mode.

From the foregoing it should be apparent that the present invention provides a temperature monitoring circuit which provides reliable protection against potentially dangerous conditions. The preferred embodiment provides important failsafe features which prevent the circuit from being overridden by such measures as disconnecting either the temperature sensor or the valve.

Of course, it should be understood that various changes and modifications to the preferred embodiment described herein will be apparent to those skilled in the art. For example, the temperature sensor can be chosen to trigger an alarm when water temperature falls below a pre-selected value. In addition solid state circuitry can be substituted for many of the disclosed circuit components. Such changes and modifications can be made without departing from the spirit and scope of the present invention, and without diminishing its attendant advantages. It is, therefore, intended that all such changes and modifications be covered by the following claims .

I claim:

1. A temperature monitoring and alarm circuit for a source of fluid, said circuit comprising:
   sensor means, responsive to the temperature of said source, for providing a first signal when the temperature of said source is within a selected temperature range;
   alarm means for generating an alarm signal;
   first switching means, responsive to said sensor means, for disabling said alarm means in response to said first signal;
   second switching means for latching said alarm means in an activated state after a momentary interruption of said first signal; and
   third switching means, responsive to the first and second switching means, for controlling a valve mounted to control the fluid flow from said source of fluid.

2. The circuit of claim 1 wherein the first switching means includes first relay means having a switching time less than a first time interval, the second switching means includes second relay means having a switching time greater than said first time interval, and the first relay means operates to de-energize the second relay means in response to the first signal.

3. The circuit of claim 1 or 2, wherein the alarm means includes a visual alarm indicator and an audio alarm annunciator.

4. A temperature monitoring and alarm circuit for a source of fluid, said circuit powered by a voltage source having first and second terminals, said circuit comprising:
   a first conductor;
   means for connecting the first conductor to the first terminal;
   a second conductor;
   means for connecting the second conductor to the second terminal;
   a third conductor;
   alarm means connected between the first and third conductors;
   sensor means, responsive to the temperature of said source, for providing an indication when the temperature of said source is outside of a selected temperature range;
   switch means, responsive to the sensor means, for interconnecting said second and third conductors when sensor means provides said indication; and
   latch means, responsive to a momentary interconnection between said second and third conductors, for maintaining said second and third conductors in electrical contact once said switch means has interconnected said second and third conductors.

5. The circuit of claim 4 wherein the alarm means includes a visual alarm indicator and an audio alarm.

6. The circuit of claim 4 wherein the switch means includes a first relay having a coil connected in series with the sensor means between the first and second conductors and a first switch connected to establish an electrical connection between the second and third conductors when the first relay is de-energized.

7. The circuit of claim 6 wherein the latch means includes a second relay having a coil connected between the first and third conductors and a second switch connected to establish an electrical connection between the second and third conductors when the second relay is energized, said second relay having a slower switching time than said first relay.

8. The circuit of claim 4 or 5 or 6 or 7 further including:
   valve means, responsive to current applied to a valve lead, for permitting fluid flow from said source when current is applied to said valve lead and for shutting off fluid flow from said source when current is removed from said valve lead; and
   valve control means, coupled between the first and third conductors, for removing current from said valve lead when said third conductor is connected to said second conductor.

* * * * *